US012636670B2

(12) United States Patent (10) Patent No.: US 12,636,670 B2

Iida et al. (45) Date of Patent: May 26, 2026

(54) ROBOT FOR COATING A VEHICLE BODY

(71) Applicant: ABB Schweiz AG, Baden (CH)

(72) Inventors: Kisumi Iida, Tokyo (JP); Takahiro Tawata, Tokyo (JP); Norio Umezawa, Tokyo (JP)

(73) Assignee: ABB Schweiz AG, Baden (CH)

( * ) Notice: Subject to any disclaimer, the term of this patent is extended or adjusted under 35 U.S.C. 154(b) by 572 days.

(21) Appl. No.: 18/186,678

(22) Filed: Mar. 20, 2023

(65) Prior Publication Data

US 2023/0302480 A1 Sep. 28, 2023

(30) Foreign Application Priority Data

Mar. 28, 2022 (JP) ................................ 2022-052327

(51) Int. Cl.
| | |
|---|---|
| *B05B 12/08* | (2006.01) |
| *B05B 13/00* | (2006.01) |
| *B05B 13/04* | (2006.01) |
| *B05B 15/58* | (2018.01) |
| *B25J 5/02* | (2006.01) |
| *B25J 11/00* | (2006.01) |
| *B25J 13/08* | (2006.01) |
| *B41J 2/175* | (2006.01) |

(52) U.S. Cl.
CPC ........ *B05B 13/0431* (2013.01); *B05B 12/085* (2013.01); *B05B 13/002* (2025.08); *B05B 13/0433* (2025.08); *B05B 15/58* (2018.02); *B25J 5/02* (2013.01); *B25J 11/0075* (2013.01); *B25J 13/088* (2013.01); *B41J 2/175* (2013.01)

(58) Field of Classification Search
None
See application file for complete search history.

(56) References Cited

U.S. PATENT DOCUMENTS

| | | | |
|---|---|---|---|
| 2010/0330292 A1 | 12/2010 | Endregaard et al. | |
| 2016/0355026 A1 | 12/2016 | Mathis et al. | |
| 2020/0324416 A1 | 10/2020 | Collmer et al. | |
| 2020/0406617 A1* | 12/2020 | Tawata | B05B 13/0431 |
| 2022/0274398 A1* | 9/2022 | Tawata | B41J 2/15 |
| 2022/0274420 A1 | 9/2022 | Hozumi et al. | |
| 2022/0305662 A1 | 9/2022 | Tawata | |

(Continued)

FOREIGN PATENT DOCUMENTS

| | | |
|---|---|---|
| JP | 2016-221958 A | 12/2016 |
| JP | 2019-511377 A | 4/2019 |

(Continued)

*Primary Examiner* — Binu Thomas
(74) *Attorney, Agent, or Firm* — Greenberg Traurig, LLP

(57) ABSTRACT

A robot for coating a vehicle body includes a coating head, a reservoir for storing coating material, a supply device capable of controlling the pressure of coating material flowing through a circulation path provided between the coating head and the reservoir, and an arm having a coating head and a supply device. The arm is a multi-axis arm having multiple arm members and a movable shaft connecting each arm member to each other, and it has a posture control means that controls the posture of the multiple arm members during coating of the vehicle body by the coating head to maintain the relative position of the coating head and the supply device at a constant level or to suppress fluctuations in the relative position within a predetermined allowable range.

5 Claims, 9 Drawing Sheets

(56)                   References Cited

U.S. PATENT DOCUMENTS

2023/0109844 A1 *    4/2023   Yamauchi ............. B05B 15/557
                                                             134/38
2024/0066696 A1 *    2/2024   Fujisawa ................ B25J 9/0087
2024/0316787 A1 *    9/2024   Tawata ................. B25J 19/0054

FOREIGN PATENT DOCUMENTS

JP              6948482  B1     10/2021
JP            69-79546  B1 *  12/2021
WO           2008108401  A1      9/2008
WO           2021040005  A1      3/2021
WO           2021205537  A1     10/2021
WO           2021255896  A1     12/2021
WO       WO-2022049718  A1 *    3/2022    ............. B05C 11/10

* cited by examiner

P1 P2

P5 P4

P3

Coating material
area (a)

Time (s)

(b)

Time (s)

(a)

(b)

ROBOT FOR COATING A VEHICLE BODY

CROSS-REFERENCE TO RELATED APPLICATIONS

This application claims priority to Japanese patent application Serial No.: 2022-052327, filed on Mar. 28, 2022; which is herein incorporated by reference in its entirety.

TECHNICAL FIELD

This invention relates to a robot for coating a vehicle body which is equipped with a coating head having multiple nozzles that spray out a coating material.

BACKGROUND ART

There is a widespread technology for coating vehicle bodies using a coating robot equipped with coating heads having multiple nozzles to dispense a coating material. Such a coating robot has a multi-axis arm having, for example, multiple arm members and a movable shaft connecting each arm member to one another, and of the multiple arm members, a coating head is provided in the arm member that is the tip, and a coating material supply device for supplying a coating material to the coating head is provided (see, for example, Patent Document 1). The coating material supply device includes, for example, a tank for storing coating material, a supply path for supplying coating material to the coating head, and a return flow path for returning coating material not used by the coating head to the tank, so that the coating material is circulated between the tank and the coating head. Such a coating material supply device is also equipped with a supply pump that pumps coating material into the supply path and a retraction pump that draws coating material into the return flow path. The supply pump and retraction pump are controlled based on the detection results from the pressure sensors or other detection means installed in the supply path and return flow path. By this control, it is possible to maintain not only the pressure of coating material flowing in the supply path and return flow path, but also the pressure of coating material present inside the coating head within an appropriate pressure range.

PRIOR ART DOCUMENTS

Patent Documents

[Patent Document 1] WO 2021/040005

SUMMARY OF INVENTION

Problem to be Solved by the Invention

In the above-mentioned coating of the vehicle body using the coating robot, the posture of the multi-axis arm, i.e., the posture of each member of the multi-axis arm, changes as the coating position of the vehicle body is changed by the coating head. If the above-mentioned coating material supply device is installed in one of the multiple arm members constituting the multi-axis arm, when the posture of the multi-axis arm changes, the posture (inclination) of coating material supply device relative to the coating head also changes. Therefore, even if the pressure of coating material flowing along the supply path or return flow path is controlled in the coating material supply device, it is difficult to maintain the pressure of coating material present inside the coating head within an appropriate pressure range. For example, it is possible to detect the pressure of coating material inside the coating head and control the supply pump and retraction pump of coating material supply device based on the detection results. However, complex control is required to maintain the pressure at an appropriate level.

This invention was invented to solve the problem described above, and the purpose of this invention is to provide a technology with which is possible to maintain not only the pressure of coating material flowing along the supply path and return flow path of coating material supply device, but also maintain the pressure of coating material present inside the coating head within an appropriate pressure range by suppressing changes in the posture of the multi-axis arm as much as possible.

Means for Solving the Problems

In order to solve the problems described above, the robot for coating the vehicle body of this invention has a coating head that dispenses coating material onto the vehicle body; a supply device that has a circulation path for circulating the coating material between a reservoir storing the coating material and the coating head, and that is capable of controlling a pressure of coating material flowing through the circulation path; and an arm having the coating head and the supply device; wherein the said arm is a multi-axis arm having multiple arm members and a movable shaft connecting each arm member to each other, and it has a posture control means that controls the posture of the multiple arm members constituting the said multi-axis arm during coating of the vehicle body by the coating head to maintain the relative position of the coating head and the supply device at a constant level or to suppress fluctuations in the relative position within a predetermined allowable range, and a moving mechanism for moving the multi-axis arm along the coating direction of the vehicle body in the coating head during coating of the vehicle body by the coating head.

In addition, the circulation path includes a supply path for supplying the coating material stored in the reservoir to the coating head and a return flow path for returning the coating material not used by the coating head to the reservoir; and the supply device has a dispensing means for feeding the coating material stored in the reservoir to the supply path; a retracting means for drawing the coating material from the coating head into the return flow path; a first detection means for detecting the pressure of coating material fed to the supply path; a second detection means for detecting the pressure of coating material drawn into the return flow path; a pressure control means for controlling a dispensing amount of coating material by the dispensing means based on the detection result by the first detection means and for controlling a drawing amount of coating material by the retracting means based on the detection result by the second detection means.

In this case, it is preferable that the posture control means controls a posture of the multiple arm members constituting the multi-axis arm based on the detection result from the first detection means and the second detection means.

In addition, the arm has a base that rotatably supports the multiple arm members coupled via the movable shaft portion in a 2-axis direction; and the movement mechanism has: a guide member extending along the coating direction of the coating head; a driving means for moving the base along the guide member; and the guide member is provided on the floor surface of a coating chamber for coating the vehicle body.

In addition, the arm has a base that rotatably supports the multiple arm members coupled via the movable shaft portion in a 2-axis direction; and the movement mechanism has a guide member extending along a coating direction of the coating head; a driving means for moving the base along the guide member; and the guide member is provided at a location on a side surface of a coating chamber for coating the vehicle body or above the vehicle body to be coated.

Effects of this Invention

According to this invention, it is possible to maintain not only the pressure of coating material flowing along the supply path and return flow path of coating material supply device, but also the pressure of coating material present inside the coating head within an appropriate pressure range by suppressing changes in the posture of the multi-axis arm as much as possible.

DETAILED DESCRIPTION OF THE EMBODIMENTS

A robot 10 for coating the vehicle body which implements this invention will be described below on the basis of the drawings. The robot 10 for coating the vehicle body is hereinafter referred to as a coating robot 10. The coating robot 10 of this embodiment is arranged to the side of a coating line in an automobile manufacturing plant and is used for coating vehicle bodies FR conveyed along the coating line.

Moreover, in this embodiment, the object to be coated by the coating robot 10 (hereinafter referred to as the "object to be coated") is an automobile body FR as an example, but the object to be coated may also be an automobile part other than a vehicle body (examples include, but are not limited to, doors, hoods, various panels, etc.), or various parts other than automobile parts (for example, airplane or railway exterior parts), and thus is not limited to a vehicle body of an automobile and may be any object that requires coating.

Coating here is performed for the purpose of forming a coating film on the surface of the object to be coated to provide protection of that surface and improved appearance. Therefore, coating includes not only the coating of an object to be coated using coating material of a specific color or coating material having a specific function, but also the coating of an object to be coated using coating materials of multiple colors in sequence. Furthermore, coating includes coating of patterns, illustrations, images, etc.

Figure 1:
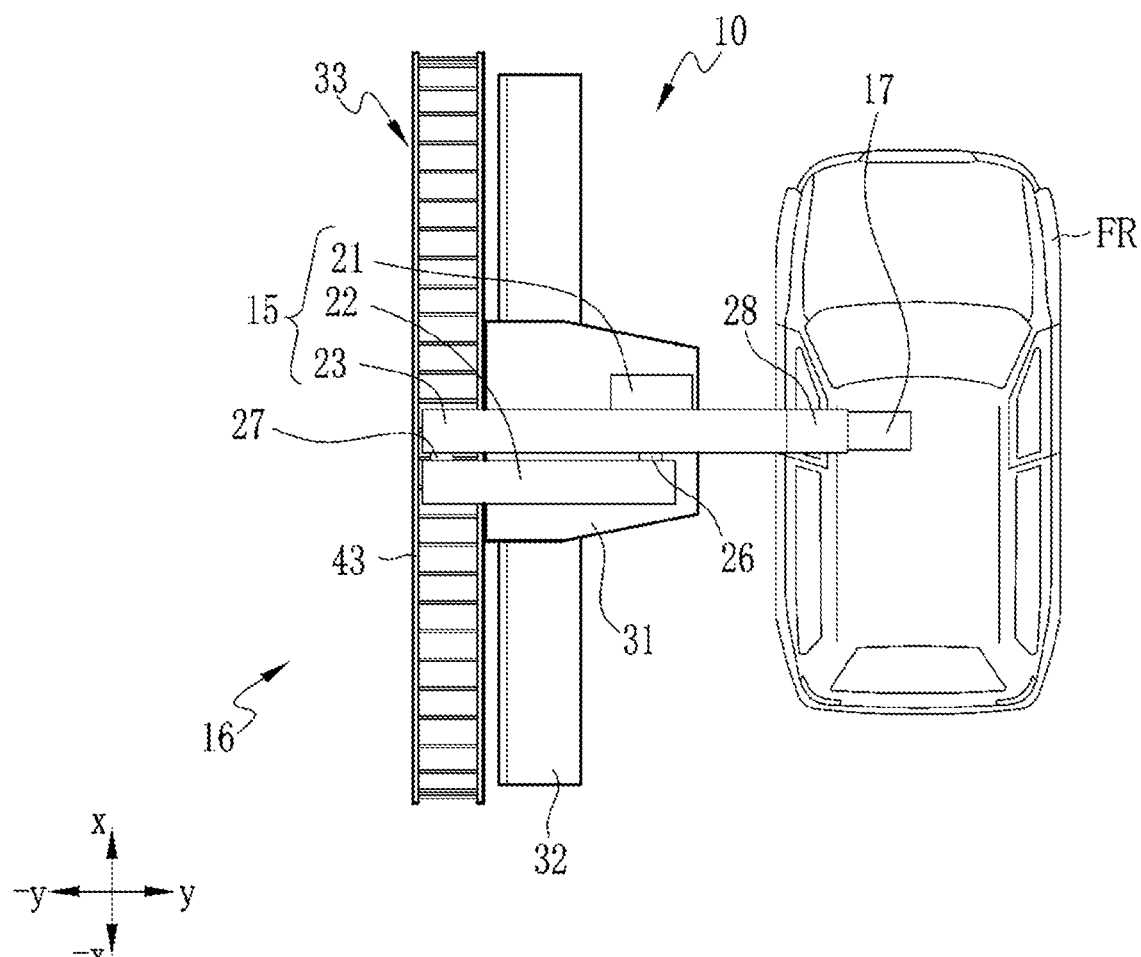
FIG. 1 It is a top view showing the configuration of a robot for coating the vehicle body in accordance with this invention.
Figure 2:
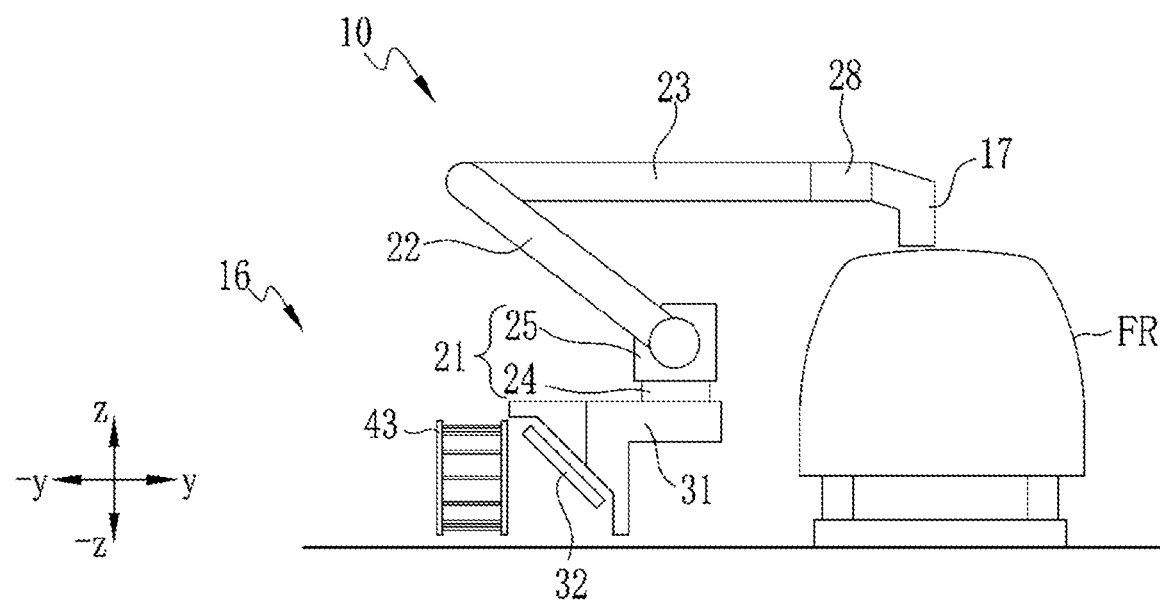
FIG. 2 It is a diagram of the robot for coating the vehicle body shown in FIG. 1 from the upstream side of the coating line.
Figure 3:
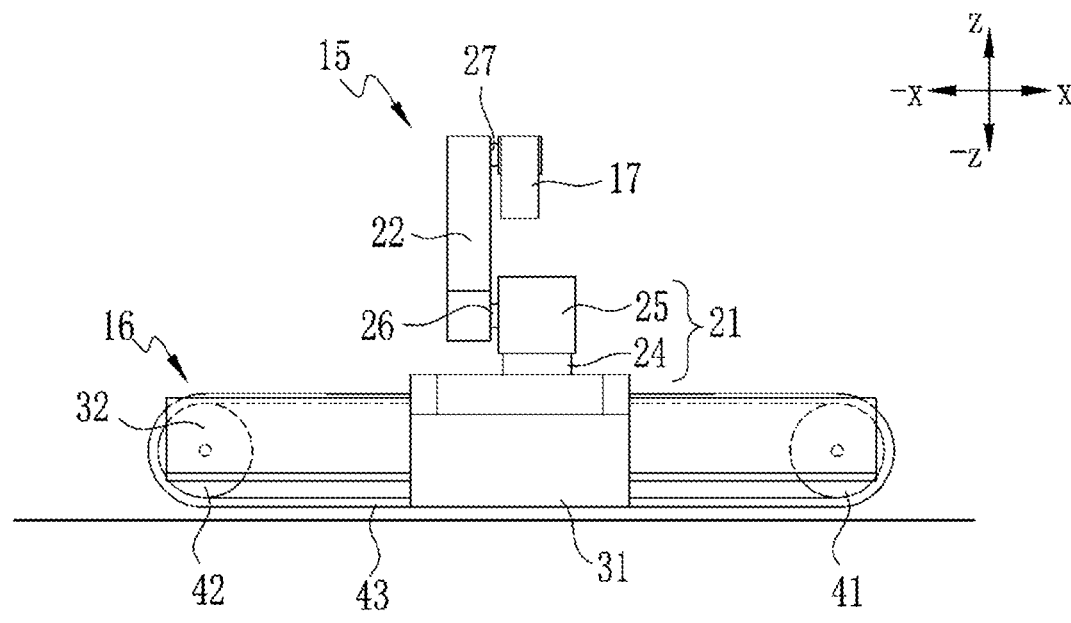
FIG. 3 It is a diagram of the robot for coating the vehicle body shown in FIG. 1 from the vehicle body side.

As shown in FIG. 1 to FIG. 3, the coating robot 10 has, by way of example, a robot arm 15, a moving device 16, and a coating head unit 17. Here, the moving device 16 corresponds to the moving mechanism as described in the Claims. The robot arm 15 is composed of a multi-axis arm having a base 21 and multiple (two in FIG. 1) arm members 22, 23. The base 21 has a fixed portion 24 secured to the moving platform 31 described below and a rotation portion 25 rotatable relative to the fixed portion 24. Here, base 21 corresponds to the base described in Claims. The fixed portion 24 includes a motor M1 (see FIG. 5) inside. The rotation portion 25 rotates as a rotation center in a direction perpendicular to the floor surface of the coating line (z direction or −z direction in FIG. 2 or FIG. 3) due to the drive of the motor M1.

Hereinafter, among the multiple arm members 22, 23, the arm member 22 coupled to the rotation portion 25 is referred to as the first rotary arm 22, and the arm member 23 coupled to the first rotary arm 22 is referred to as the second rotary arm 23.

The first rotary arm 22 is coupled to the movable shaft portion 26 provided in the rotation portion 25 at one end in the direction of extension of the first rotary arm 22. The movable shaft 26 provided in the rotating section 25 is provided with a motor M2 (see FIG. 5) to cause the coupled first rotary arm 22 to rotate on a plane orthogonal to the floor surface of the coating line (e.g., a yz plane when the robot arm 15 is in the state of FIG. 2).

In the direction of extension of the first rotary arm 22, the second rotary arm 23 is coupled via a movable shaft 27 to the other end, which is opposite to the one end coupled to the movable shaft 26 of the rotation portion 25. The movable shaft 27 is provided with a motor M3 (see FIG. 5) as described below to cause the coupled second rotary arm 23 to rotate on a plane orthogonal to the floor surface of the coating line (e.g., a yz plane when the robot arm 15 is in the state of FIG. 2). Moreover, although an illustration with drawing is omitted, the center axis of the movable shaft portion 26 of the rotation portion 25 and the center axis of the movable shaft portion 27 provided in the first rotary arm 22 are parallel. Moreover, the second rotary arm 23 is provided with a coating material circulation device 51 as described below.

The other end of the second rotary arm 23 in the direction of extension is provided with a wrist portion 28. The wrist portion 28 holds the coating head unit 17. Although the configuration details are omitted, the wrist portion 28 has multiple motors M4, M5, M6 (3 motors here) (see FIG. 5) each with a different axis direction of the drive shaft, and driving any of these motors causes the held coating head unit 17 to rotate using any one of the multiple shafts that the wrist portion 28 has as a rotation center. It should be noted that the number of shafts should be two or more.

The moving device 16 is installed, for example, on the floor surface of the coating chamber and moves the robot arm 15 forward and backward along the floor surface of the coating chamber in one direction (x-direction or −x-direction in FIG. 1 or FIG. 3). Moreover, the moving direction of the robot arm 15 by the moving device 16 is the coating direction (main scanning direction) of the coating head 56 described below. The moving device 16 has a moving platform 31 to which the base 21 of the robot arm 15 is fixed, a rail 32 that guides the movement of the moving platform 31, and a drive mechanism 33 that moves the moving platform 31 forward and backward along the rail 32. The rail 32 is secured to the floor surface of the coating chamber by a frame, about which the illustration with drawing is omitted, for example, in a state that the direction of extension of the rail 32 is along the x or −x direction in FIG. 1. Here, the rail 32 corresponds to a guide member as described in the Claims.

The drive mechanism 33 is secured, for example, to the floor surface of the coating chamber by a frame, about which the illustration with drawing is omitted. The drive mechanism 33 comprises, as an example, a drive motor 110 (see FIG. 5), a drive side sprocket 41, a driven side sprocket 42, and a drive belt 43 that is wound around these sprockets 41, 42. Here, the drive mechanism 33 corresponds to the drive means described in the Claims. Although the illustration with drawing is omitted, the drive side sprocket 41 and the driven side sprocket 42 each comprise, for example, two discs with multiple teeth formed on their outer circumference and a drive shaft holding these discs coaxially. Moreover, the drive side sprocket 41 and the driven side sprocket 42 are arranged along the floor surface of the coating chamber (in FIG. 1, the center of rotation of these sprockets is along the y and −y directions). By way of example, the drive belt 43 has two chain belts wound around each of the two discs of the drive side sprocket 41 and the driven side sprocket 42, and multiple connecting rods positioned across the two chain belts wound around each of the drive side sprocket 41 and the driven side sprocket 42 in multiple positions. It should be noted that rather than using a chain belt, it is also fine to use an endless belt made of rubber.

Thus, the drive belt 43, which is wound around the drive side sprocket 41 and the driven side sprocket 42, travels in the x or −x direction in FIG. 3. As described above, the moving platform 31 is secured to the drive belt 43, so when the drive belt 43 travels in the x or −x direction in FIG. 3, the moving platform 31 moves in the x or −x direction in FIG. 3 along the direction of extension of the rail 32.

The coating head unit 17 includes a coating head 56 as described below, a head control unit (see FIG. 5) for controlling operation of said coating head 56, and the like.

Figure 4:
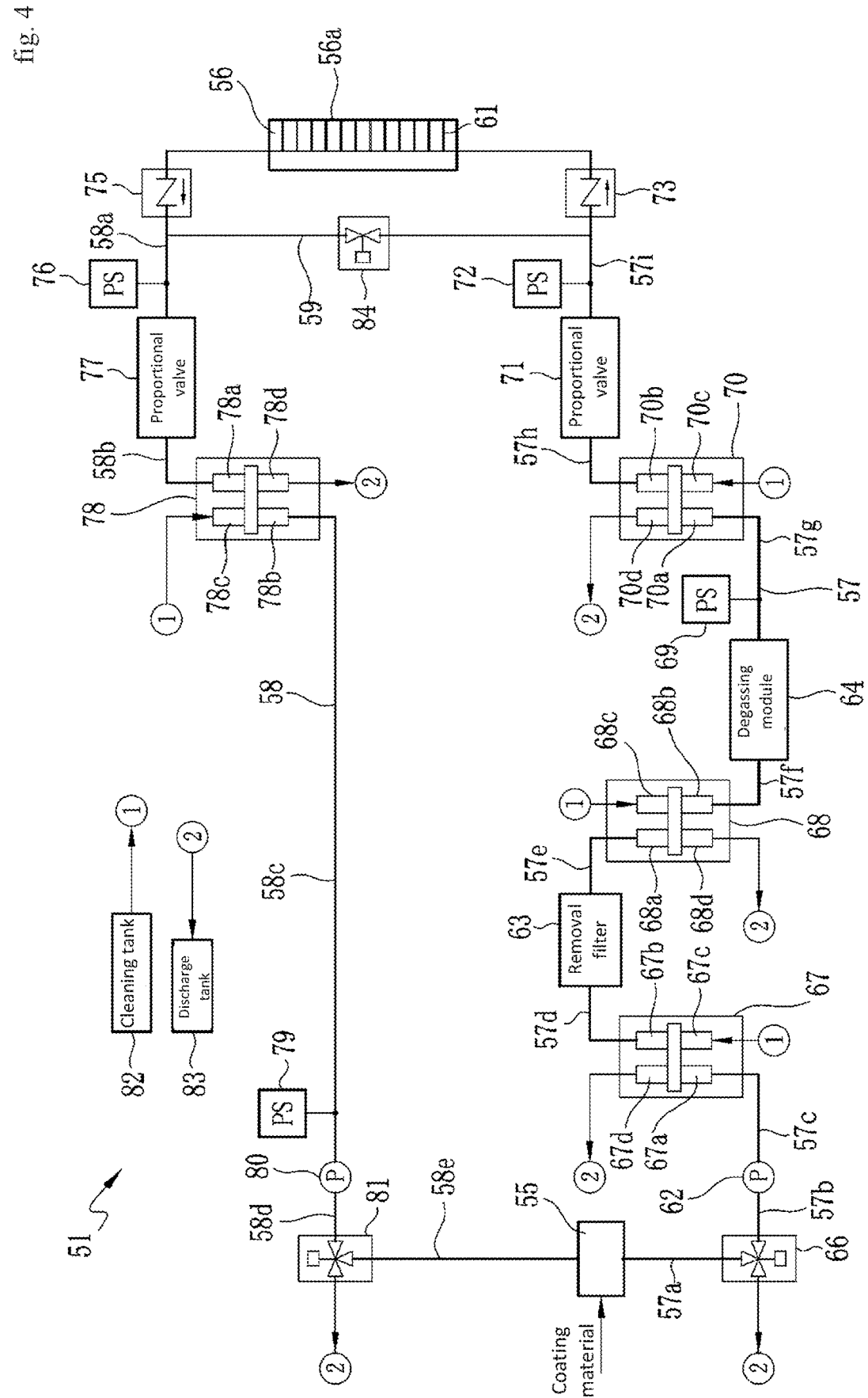
FIG. 4 It is a diagram showing an example of the configuration of a coating material circulation device.

Next, the coating material circulation device 51 will be described. As shown in FIG. 4, the coating material circulation device 51 has, for example, a supply path 57 that supplies coating material stored in the coating material tank 55 to the coating head 56, and a return flow path 58 (reflux path) that returns coating material not used in the coating head 56 to the coating material tank 55 from the coating head 56, and a bypass path 59 that flows from the supply path 57 to the return flow path 58 without supplying coating material to the coating head 56. Also, a coating material tank 55, gear pumps 62 and 80 are mounted on the coating material circulation device 51 on the floor of the coating material room, and houses parts such as, for example, removal filter 63, degassing module 64, switching valves, proportional valves, and pressure gauges, etc. inside the second rotary arm 23. Here, the coating material circulation device 51 corresponds to the supply device as described in the Claims. In addition, the coating material tank 55 corresponds to the reservoir of the Claim. Moreover, the gear pumps 62 and 80 may employ a configuration that is housed, for example, within the second rotary arm 23. In addition, a configuration may be employed in which at least one part of the removal filter 63, degassing module 64, switching valve, proportional valve, pressure gauge, and the like is mounted on the floor.

The coating material circulation device 51 circulates coating material between the coating material tank 55 and the coating head 56 by supplying coating material stored in the coating material tank 55 to the coating head 56 when coating the vehicle body FR and refluxing coating material not used in the coating head 56 from the coating head 56 to the coating material tank 55. In addition, when the coating material circulation device 51 is not coating the vehicle body FR, the coating material stored in the coating material tank 55 flows through the supply path 57, bypass path 59, and return flow path 58, in that order, and returns to the coating material tank 55.

By the way, coating materials used for coating the vehicle body FR are, for example, water-based coating materials and solvent-based coating materials using pigments. Thus, by circulating the coating material by the coating material circulation device 51, separation of the pigments contained in the coating material and agglomerating of the pigments is prevented.

When describing the configuration of the supply path 57 of coating material circulation device 51, the coating material tank 55 side is the upstream side and the coating head 56 side is the downstream side in the coating material supply direction. In addition, when describing the configuration of the return flow path 58 of coating material circulation device 51, the coating head 56 side is the upstream side and the coating material tank 55 side is the downstream side.

The coating material tank 55 stores the coating material used for coating the vehicle body FR using the coating head 56. The coating material tank 55 is arranged outside the coating robot 10 (for example, on the floor of the coating room). Moreover, the coating material tank 55 is supplied with coating material from outside as necessary in the process of coating the vehicle body FR using the coating head 56. In addition, if coating material is refluxed from the return flow path 58 to the coating material tank 55, air bubbles flowing with the coating material float on the surface of the liquid within the coating material tank 55, which may have the function of removing the air bubbles.

The coating head 56 has a nozzle forming surface 56*a* with multiple nozzles 61 arranged in a two-dimensional array, and the coating material supplied via the supply path 57 is discharged from each of the multiple nozzles 61 to form a coating film on the surface of the vehicle body FR. Moreover, the detailed configuration of the coating head 56 is omitted.

The supply path 57 is a path that supplies coating material stored in the coating material tank 55 to the coating head 56. The supply path 57 has flow paths 57*a*, 57*b*, . . . , 57*h*, 57*i*, as described below. In addition, in the middle of the supply path 57, from the upstream side of the supply path 57, the gear pump 62, the removal filter 63, and the degassing module 64 are arranged, in that order.

The gear pump 62 draws in the coating material stored in the coating material tank 55 and feeds the drawn-in coating material toward the coating head 56. Therefore, when gear pump 62 is driven, the pressure on the upstream side of the gear pump 62, i.e., inside the flow paths 57*a* and 57*b* between the coating material tank 55 and the gear pump 62, becomes negative, and the coating material stored in the coating material tank 55 is drawn into the flow paths 57*a* and 57*b*. It is then fed from the gear pump 62 to the flow path 57*c* connected to the downstream side of the gear pump 62. Here, gear pump 62 corresponds to the dispensing means as described in the Claims.

The flow path 57*a* and flow path 57*b* that make up the supply path 57 are connected by a three-way valve part 66. The three-way valve part 66 can be switched to either a state in which the flow path 57*a* and the flow path 57*b* are in communication or a state in which the flow path 57*b* is in communication with a drain path connected to the drain tank 83. The three-way valve part 66 is held in connection with the flow path 57*a* and the flow path 57*b*, for example, when coating the vehicle body FR. In addition, the three-way valve part 66 is in a state of communicating the flow path 57*b* and the drain tank 83 (in particular, the flow path not shown in the drawings that is connected to the drain tank 83) when cleaning the supply path 57.

In the supply path 57, a gear pump 62 is connected with the flow path 57*c* at the output side. A switching valve 67 is provided at the downstream side end of the flow path 57*c*. The switching valve part 67 has four valve parts 67*a*, 67*b*, 67*c*, and 67*d*. For example, valve part 67*a* is connected to the flow path 57*c*, and the valve part 67*b* is connected to the flow path 57*d* that is directed to the removal filter 63. In addition, the valve part 67*c* is connected to the cleaning tank 82 (in detail, the flow path not shown in the drawings that is connected to the cleaning tank 82). Furthermore, the valve part 67*d* is connected to the drain tank 83 (in detail, the flow path not shown in the drawings that is connected to the drain tank 83). Of these valves, the valve part 67*a* and valve part 67*b* are normally held in an open state. On the other hand, the valve parts 67*c* and 67*d* are normally held in a closed state and are switched from a closed state to an open state upon cleaning of the coating material circulation device 51.

A removal filter 63 is provided downstream of the flow path 57*d* connected to the valve part 67*b* of the switching valve 67. The removal filter 63 removes foreign matter such as coarse particles and pigment agglomerates contained in the coating material, as well as bubbles that exceed a predetermined size among the bubbles contained in the coating material. The removal filter 63 is for example a mesh-like body such as a metal net or resin net, or a porous body, or a metal plate in which fine through-holes have been formed. Examples of a mesh-like body include metal mesh filters, metal fibers, e.g. fine strands of metal known as SUS made into the form of felt, metal sintered filters which have been compressed and sintered, electroformed metal filters, electron beam processed metal filters, laser beam processed metal filters, and the like.

A switching valve 68 is provided downstream of the flow path 57*e* connected to the output side of the removal filter 63. The switching valve part 68, similarly to the switching valve 67, has four valve parts 68*a*, 68*b*, 68*c*, and 68*d*. For example, valve part 68*a* is connected to the flow path 57*e*, and valve part 68*b* is connected to the flow path 57*f* that is directed to the degassing module 64. In addition, the valve part 68*c* is connected to the cleaning tank 82 (in detail, the flow path not shown in the drawings that is connected to the cleaning tank 82). In addition, the valve part 68*d* is connected to the drain tank 83 (in detail, the flow path not shown in the drawings that is connected to the drain tank 83). Of these valves, valve part 68*a* and valve part 68*b* are normally held in an open position. On the other hand, the valve parts 68*c*, 68*d* are normally held in a closed state and are switched from a closed state to an open state upon cleaning of the coating material circulation device 51.

A degassing module 64 is provided downstream of the flow path 57*f* connected to the valve part 68*b* of the switching valve. The degassing module 64 removes (degasses) dissolved gas and air bubbles present in the coating material. Examples of the degassing module 64 include a hollow fiber membrane bundle made by bundling multiple hollow fiber membranes.

A pressure gauge 69 is provided in the flow path 57*g* connected to the output side of the degassing module 64. The pressure gauge 69 measures the pressure of coating material dispensed from the degassing module 64. The measurement result by the pressure gauge 69 is output to the coating material supply control unit 103 (see FIG. 5). The gear pump 62 is driven by the coating material supply control unit 103 so that the pressure value detected by the pressure gauge 69 is constant. Moreover, the pressure gauge 69 corresponds to the first detection means as described in the Claims. In addition, in the supply path 57, a pressure gauge other than the pressure gauge 69 may be provided.

At the downstream side end of the flow path 57*g* described above, a switching valve 70 is provided. Similarly to the switching valve 67 and the switching valve 68, the switching valve 70 has four valve parts 70*a*, 70*b*, 70*c*, and 70*d*. For example, the valve part 70*a* is connected to the flow path 57*g*, and the valve part 70*b* is connected to the flow path 57*h*. In addition, the valve part 70*c* is connected to the cleaning tank 82 (in detail, the flow path not shown in the drawings that is connected to the cleaning tank 82). In addition, valve part 70*d* is connected to the drain tank 83 (in detail, the flow path not shown in the drawings that is connected to the drain tank 83). Of these valves, the valve part 70*a* and the valve part 70*b* are normally held in the open state. On the other hand, the valve parts 70*c*, 70*d* are normally held in a closed state and are switched from a closed state to an open state upon cleaning of coating material circulation device 51.

A proportional valve 71 is connected to the downstream side end of the flow path 57*h* connected to the valve portion 70*b* of the switching valve. The proportional valve 71 is opened and closed by the coating material supply control unit 103 so that the pressure value of coating material flowing downstream of the proportional valve 71 is constant.

A flow path 57*i* is provided downstream of the proportional valve 71. The flow path 57*i* is provided with a pressure gauge 72 and a one-way valve 73. The pressure gauge 72 measures the pressure of coating material flowing from the proportional valve 71 toward the coating head 56. The one-way valve 73 flows coating material in one direction (in this case, from the proportional valve 71 toward the coating head 56) and prevents it from flowing in the opposite direction. Moreover, the upstream side end of the bypass path 59 is connected to the flow path 57*h* between the pressure gauge 72 and the one-way valve 73.

The return flow path 58 is a flow path that returns coating material not used by the coating head 56 when coating the vehicle body FR, or that is circulated through the bypass flow path 59 to the coating material tank 55. The return flow path 58 has flow paths 58*a*, 58*b*, 58*c*, 58*d*, and 58*e*.

A coating head 56 is connected to the flow path 58*a* at the upstream side end. The flow path 58*a* is provided with a one-way valve 75 and a pressure gauge 76. The one-way valve 75 flows coating material in one direction (in this case, from the coating head 56 toward the pressure gauge 76) and prevents it from flowing in the opposite direction. It should be noted that the downstream side end of the bypass flow path 59 is connected to the flow path 58*a* between the one-way valve 75 and the pressure gauge 76. The pressure gauge 76 measures the pressure of coating material flowing upstream of the proportional valve 77 (i.e., the flow from the coating head 56 toward the proportional valve 77).

A proportional valve 77 is provided downstream of the flow path 58*a*. The proportional valve 77 is controlled by the coating material supply control unit 103 to open and close and to maintain a constant pressure value of coating material flowing from the coating head 56 toward the proportional valve 77.

A switching valve 78 is provided downstream of the flow path 58*b* connected to the output side of the proportional valve 77. Similarly to the switching valves 67, 68, 70 provided in the supply path 57, the switching valve 78 has four valve parts 78*a*, 78*b*, 78*c*, and 78*d*. For example, the valve part 78*a* is connected to the flow path 58*b*, and the valve part 78*b* is connected to the flow path 58*c* directed to the gear pump 80. In addition, the valve part 78*c* is connected to the cleaning tank 82 (in detail, the flow path not shown in the drawings that is connected to the cleaning tank 82). In addition, the valve part 78*d* is connected to the drain tank 83 (in detail, the flow path not shown in the drawings that is connected to the drain tank 83). Of these valves, valve 78*a* and valve 78*b* are normally held in the open position. On the other hand, valves 78*c*, 78*d* are normally held in a closed state and are switched from a closed state to an open state upon cleaning of the coating material circulation device 51.

The flow path 58*c* is provided with a pressure gauge 79. The pressure gauge 79 measures the pressure of coating material flowing into the flow path 58*c*. The measurement result by the pressure gauge 79 is output to the coating material supply control unit 103. Moreover, the pressure gauge 79 corresponds to a second detection means as described in the Claims.

A gear pump 80 is provided at the downstream side end of the flow path 58*c*. The gear pump 80 draws coating material into the flow path 58*c* and pumps the drawn coating material toward the coating material tank 55. Therefore, by driving the gear pump 80, the pressure inside the upstream side of the gear pump 80, i.e., the flow path 58*c*, becomes negative, and the coating material is drawn into the flow path 58*c*. The coating material is then pumped from the gear pump 80 to the flow path 58*d* connected to the downstream side of the gear pump 80. At this time, the gear pump 80 is driven and controlled by the coating material supply control unit 103 so that the pressure value detected by the pressure gauge 79 is a constant value. Here, the gear pump 80 corresponds to the first pump as described in the Claims.

A three-way valve 81 is connected to the downstream side of the flow path 58*d* connected to the output side of the gear pump 80. The three-way valve 81 switches between a state in which the flow path 58*d* is connected to the flow path 58*e* connected to the coating material tank 55 and a state in which the flow path 58*d* is connected to the drain tank 83. The three-way valve 81 is kept in the state of connecting the flow path 58*d* and flow path 58*e* during coating of the vehicle body FR by the coating head 56 or during circulation of the coating material. The three-way valve 81 switches from connecting the flow path 58*d* and the flow path 58*e* to connecting the flow path 58*d* and the drain tank 83 during cleaning. As a result, the cleaning liquid and air flowing through the flow path 58*d* are discharged into the drain tank 83 via the three-way valve 81.

The bypass path 59 is connected to the flow path 57*i* and the flow path 58*a* to flow a portion of coating material flowing through the supply path 57 to the return flow path 58 without flowing to the coating head 56 when coating material is not coated by the coating head 56. A control valve 84 is provided in the bypass path 59. The control valve 84 is held closed when coating the vehicle body FR by the coating head 56 and is switched to an open state when coating the vehicle body FR by the coating head 56 is not performed.

Figure 5:
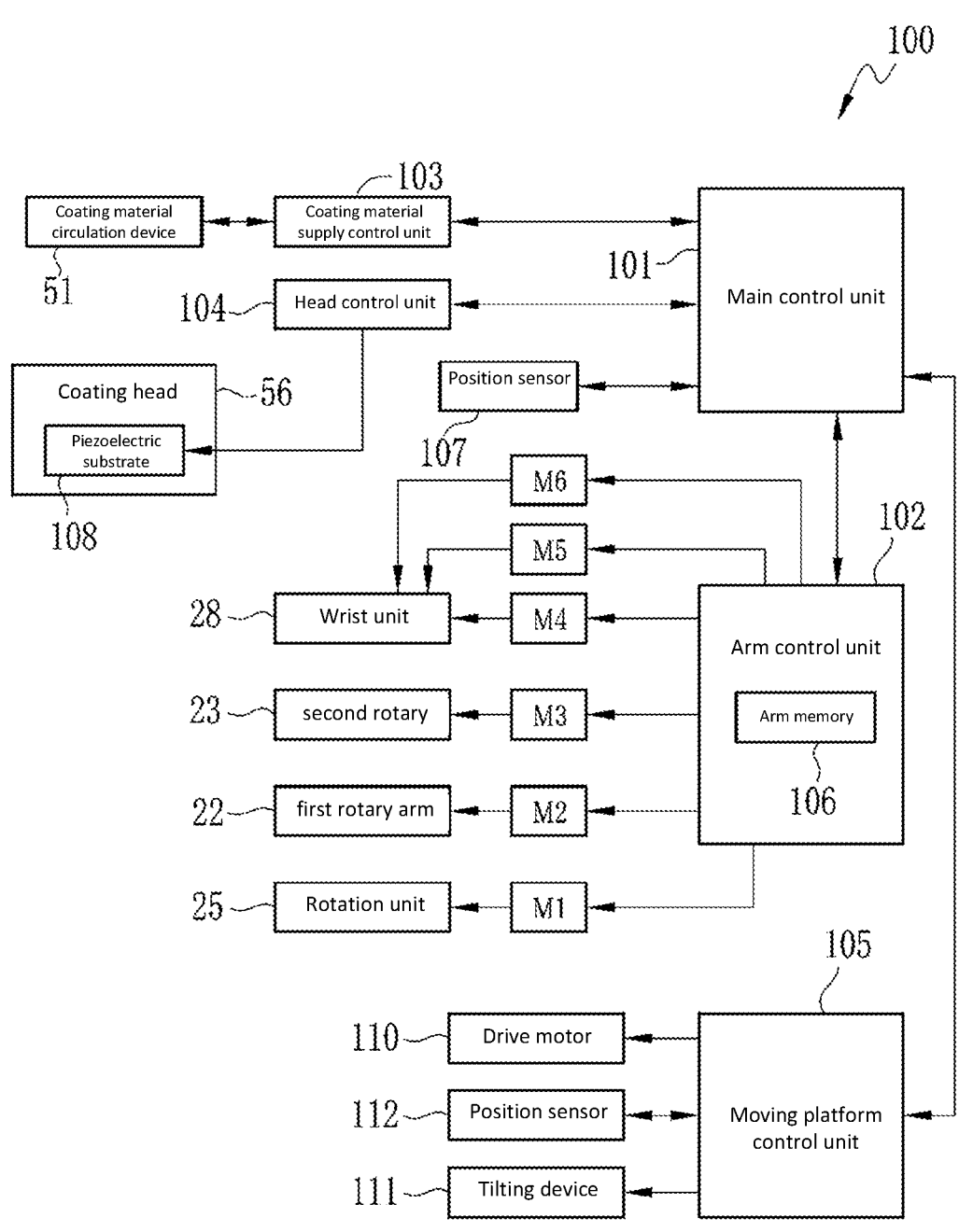
FIG. 5 It is a diagram showing an example of the configuration of a control system.

Next, a configuration to control the coating robot 10 described above (hereinafter referred to as a control system) will be described. FIG. 5 is a diagram showing a configuration of a control system. As shown in FIG. 5, the control system 100 has a main control unit 101, an arm control unit 102, a coating material supply control unit 103, a head control unit 104, and a moving platform control unit 105. Although the illustration with drawing is omitted, the main control unit 101, the arm control unit 102, the head control unit 103, the coating material supply control unit 104, and the moving platform control unit 105 described below are composed of a central processing unit (CPU), a storage site (read only memory (ROM), random access memory (RAM), non-volatile memory, etc.), and other elements.

The main control unit 101 sends predetermined control signals to each of the arm control unit 102, coating material supply control unit 103, head control unit 104, and moving platform control unit 105 so that the robot arm 15, the movement unit 16, the coating material circulation unit 51, and the coating head 56 cooperate to perform coating on the object to be coated.

The arm control unit 102 provides drive control for each of the motors M1, M2, M3, M4, M5, and M6 provided in the robot arm 15 based on various data stored in its own arm memory 106. Here, various data stored in the arm memory 106 are required when coating the vehicle body FR by the coating robot 10, and includes, for example, data on the external shape of the vehicle body FR to be coated, trajectory data indicating the movement trajectory of the coating head unit 17 when coating the vehicle body FR, posture data indicating the posture of the robot arm 15 and the coating head unit 17, and the like. Here, the arm control unit 102 corresponds to the posture control means as described in Claims.

Here, the coating of the vehicle body FR with the coating robot 10 shown in this embodiment is carried out while maintaining the second rotary arm 23 in a horizontal state, i.e., in a state in which the extension direction of the second rotary arm 23 is included in the horizontal plane. Accordingly, the posture data includes, for example, the posture of the first rotary arm 22 (the amount of rotation of the motor M1 and the motor M2) when the second rotary arm 23 is maintained in a horizontal state, as well as the posture of the second rotary arm 23 (the amount of rotation of the motor M3) relative to the first rotary arm 22.

It should be noted that various data described above are stored in the arm memory 106 corresponding to each of the multiple vehicle body FRs with different external shapes when coating multiple vehicle body FRs with different external shapes with the coating robot 10.

The coating material supply control unit 103 controls the drive of the gear pumps 62, 80 and the opening and closing of the proportional valves 71, 77 based on the measurement results of the pressure gauges 69, 72, 76, and 79 provided in the coating material circulation device 51 described above to circulate the coating material stored in the coating material tank 55 of coating material circulation device 51 between the coating material tank 55 and the coating head 56. Here, the coating material supply control unit 103 corresponds to the pressure control means as described in the Claims.

The head control unit 104 operates the piezoelectric substrate 108 based on the position information of the coating head 56 detected by the position sensor 107. Here, the head control unit 104 is not only capable of controlling the operation of the piezoelectric substrate 108 but is also capable of controlling the operating frequency relative to the piezoelectric substrate 108, controlling the voltage applied to the piezoelectric substrate 108, and controlling the number of droplets of coating material discharged from each of the multiple nozzles 61 provided on the nozzle forming surface 56a of the coating head 56.

The position sensor 107 detects the position of the coating head 56 moving under the control of the arm control unit 102 and outputs its detection signal to the main control unit 101.

The moving platform control unit 105 controls the operation of the drive motor 110 of the moving device 16 described above to rotate the drive side sprocket 41 and causes the drive belt 43 wound around each of the drive side sprocket 41 and the driven side sprocket 42 to travel at the desired speed. The travelling of the drive belt 43 causes the moving platform 31 secured to the drive belt 43 to move in the x direction or −x direction in FIG. 1. In addition, if a tilting device 111 is provided, the moving platform control unit 105 controls the operation of the tilting device 111 in addition to the moving device 16.

The position sensor 112 detects the position of the moving platform 31 that moves under the control of the moving platform control unit 105, and outputs the detection signal to the main control unit 101 via the moving platform control unit 105.

The tilting device 111 is a device that tilts the moving device 16. Although the illustration with drawing is omitted, the tilting device 111 can employ a device using multiple gears and cams in addition to, for example, an air cylinder in which the rod expands and retracts relative to the cylinder body due to the supply of air. It should be noted that the tilting device 111 may not be configured to be driven and controlled by the moving platform control unit 105, but may be configured to be operated by a person or external driving means, etc., during setting of the moving device 16, for example, by adjusting the feed screw mechanism, etc.

Figure 6:
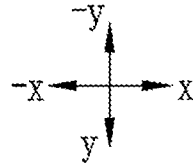
FIG. 6 It is a diagram showing an example of a moving trajectory of a coating head provided in the coating robot.

Next, the control of the vehicle body FR during coating using the coating robot 10 will be described. Moreover, FIG. 6 shows an example of a moving trajectory of the coating head 56 when coating the vehicle body TR. As shown in FIG. 6, when the coating robot 10 is not coating the vehicle body FR, the coating head 56 is held, for example, in a standby position (position P1 in FIG. 6). When coating by the coating robot 10 is started, the moving platform control unit 105 drives the drive motor 110. Driving of drive motor 110 causes the drive belt 43 wound around the drive side sprocket 41 and the driven side sprocket 42 to travel, and causes the moving platform 31 to move in the x direction in FIG. 6. Upon movement of the moving platform 31 in the x direction in FIG. 6, the robot arm 15 secured to the moving platform 31 will move in the x direction in FIG. 6. It should be noted that the speed of movement of the robot arm 15, i.e., the coating head 56, from position P1 to position P2, is 300 mm/s as an example.

At this time, an example of this control includes that the arm control unit 102 does not drive any of the motors M1, M2, M3, M4, M5, or M6. In this case, upon movement of the moving platform 31 in the x direction in FIG. 6, the postures of the first rotary arm 22 and second rotary arm 23 of the robot arm 15 will be held constant.

As the coating head 56 moves to position P2 due to movement of the moving platform 31 in the x direction in FIG. 6, the moving platform control unit 105 stops driving the drive motor 110.

When driving of the drive motor 110 is stopped, the arm control unit 102 drives the motors M2 and M3 to move the coating head 56 from position P2 to position P3. At this time, the arm control unit 102 drives the motors M2 and M3 so that the second rotary arm 23 remains in the horizontal state. Then, when the coating head 56 moved to position P3, the arm control unit 102 stops driving the motors M2 and M3. Here, the speed of movement of the robot arm 15, i.e., the coating head 56, from position P2 to position P3, is 300 mm/s, for example.

When the coating head 56 is moved to position P3, the moving platform control unit 105 drives the drive motor 110 to move the moving platform 31 and the robot arm 15 secured to the moving platform 31 in the −x direction in FIG. 6. This causes the coating head 56 to move from position P3 to position P4. Here, the speed of movement of the robot arm 15, i.e., the coating head 56, from position P3 to position P4, is 300 mm/s, for example.

Here, in the coating of the vehicle body FR by the coating head 56, when moving forward and backward between positions P4 and P5 in the −x or x direction in FIG. 6, and moving either from position P4 to position P5 or from position P5 to position P4, coating is performed using multiple nozzles provided on the nozzle forming surface 56a (hereinafter, coating using all of the multiple nozzles provided on the nozzle forming surface 56a is referred to as coating for one line), and when the coating for one line is completed, the coating head 56 is moved one line in the −y direction. Thus, between position P4 and position P5 is a coating area where coating is performed by the coating head 56. It should be noted that in the coating of the vehicle body FR by the coating head 56, the speed of movement of the coating head 56 is set in the range of, for example, 30 mm/s to 200 mm/s.

After the coating head 56 reaches position P4, the arm control unit 102 drives M4, M5 and M6 with reference to the data of the external shape of the vehicle body FR stored in the arm memory 106. At the same time, the moving platform control unit 105 drives the tilting device 111.

This causes the wrist portion 28 to rotate as the coating head 56 moves in the −x direction in FIG. 6. The drive of the tilting device 111 also causes the coating head 56 to move in a vertical direction (z or −z direction in FIG. 1). Therefore, the nozzle forming surface 56a of the coating head 56 is maintained at a constant spacing with respect to the coating area of the vehicle body FR. At this time, the second rotary arm 23 is held in a horizontal state. Therefore, when the wrist portion 28 does not rotate, the relative position of coating material circulation device 51 and the coating head 56 remains unchanged, and when the coating head 56 moves due to the rotation of the wrist portion 28, the relative position of coating material circulation device 51 and the coating head 56 changes within a predetermined range based on the rotation of the wrist portion 28. In this state, the head control unit 104 activates the piezoelectric substrate 108.

As the coating head 56 moves to position P5, the coating of one line by the coating head 56 ends. Therefore, the moving platform control unit 105 stops driving the drive motor 110. At the same time, the arm control unit 102 drives motors M2 and M3 (motor M1 as needed) to change the posture of the robot arm 15. This causes the coating head 56 to move one line in the −y direction in FIG. 6.

The moving platform control unit 105 drives the drive motor 110 to move the moving platform 31 and the robot arm 15 secured to the moving platform 31 in the x direction in FIG. 6. This causes the coating head 56 to move from position P5 toward position P4. At this time, the head control unit 104 activates the piezoelectric substrate 108. As a result, the vehicle body FR is coated by the coating head 56. In this case too, the arm control unit 102 drives the motors M4, M5, M6 of the wrist portion 28 secured to the second rotary arm 23 to change the posture of the coating head 56, and the nozzle forming surface 56a of the coating head 56 retains a constant spacing relative to the coating area of the vehicle body FR. Then, when the coating head 56 reaches position P4, the moving platform control unit 105 stops driving the drive motor 110. As a result, coating of the next line is applied to the vehicle body FR.

In the coating of the vehicle body FR, the coating head 56 is moved from position P4 to position P5 (or vice versa) and then moved one line in the −y direction multiple times. Then, when the entire vehicle body FR is coated and moved to position P5, the arm control unit 102 drives the motors M2, M3, M4, M5, and M6 to move the coating head from position P5 to position P1.

At the time of movement of the coating head 56 described above, based on the detection results of the pressure gauge 69 provided in the supply path 57 of the coating material circulation device 51 and the pressure gauge 79 provided in the return flow path 58, the pressure of the coating material flowing through the supply path 57 and the return flow path 58 is controlled. In addition, opening and closing control of the proportional valve 71 by the pressure gauge 72 and opening and closing control of the proportional valve 77 by the pressure gauge 76 are performed.

Moreover, in this embodiment, the speed of movement of the coating head 56 is reduced when the coating head 56 reaches position P4. However, the position to decelerate the speed of movement of the coating head 56 need not be limited to position P4 and may also be decelerated, for example, when position P2 is reached.

Next, in the coating of the vehicle body FR by the coating robot 10 described above, a change (fluctuation) in pressure in the interior of coating material circulation device 51 based on the state of the second rotary arm 23 is considered.

Figure 7:
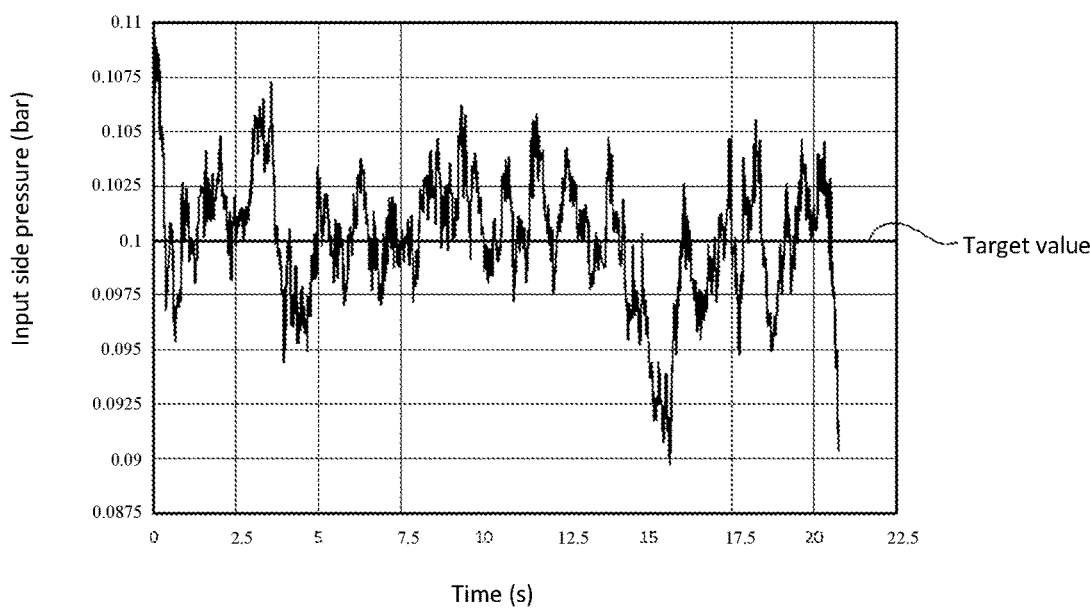
FIG. 7 (a) is a diagram showing the change in the pressure of coating material at the input side of the coating head 56 when coating is performed while the second rotary arm 23 of the robot arm 15 is in the horizontal state, and (b) is a diagram showing the change in the pressure of coating material at the output side of the coating head 56.
Figure 7:
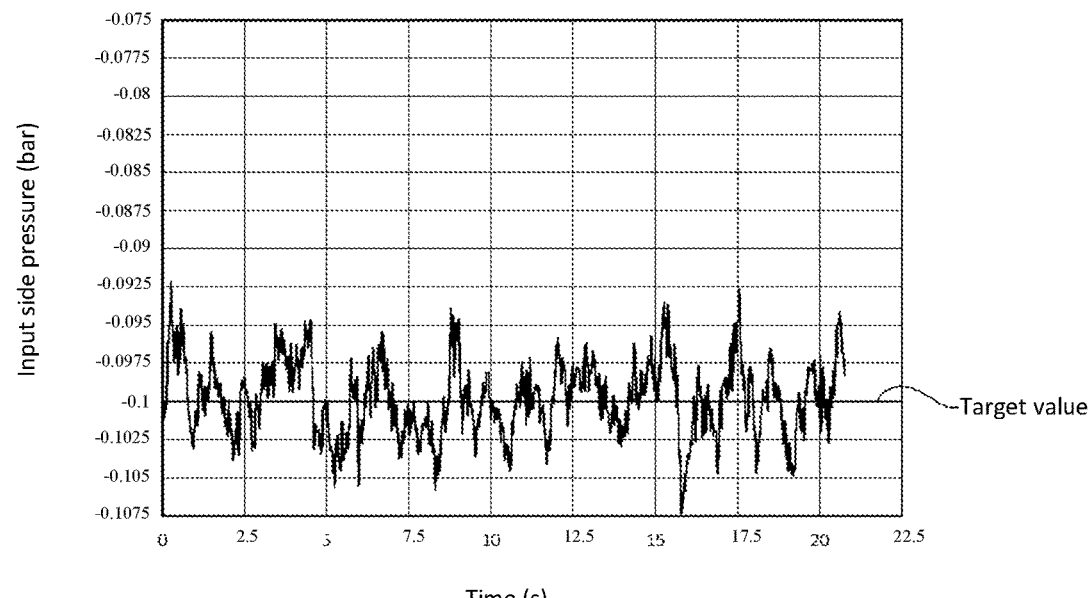
Figure 8:
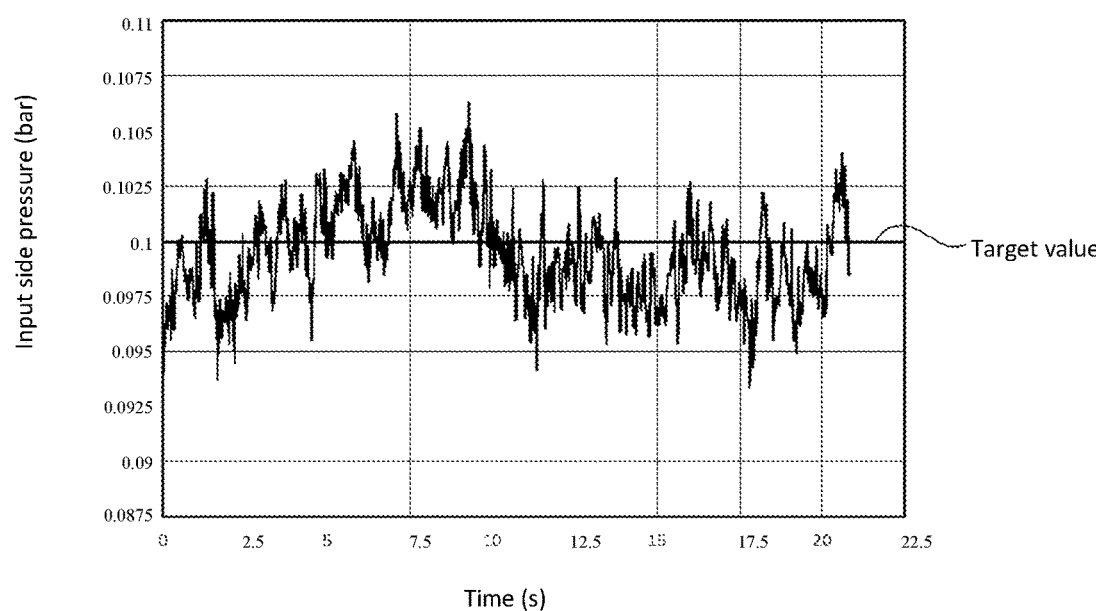
FIG. 8 (a) is a diagram showing the change in the pressure of coating material at the input side of the coated head 56 when coating is performed by changing the posture of the second rotary arm 23 of the robot arm 15, and (b) is a diagram showing the change in the pressure of coating material at the output side of the coated head 56.
Figure 8:
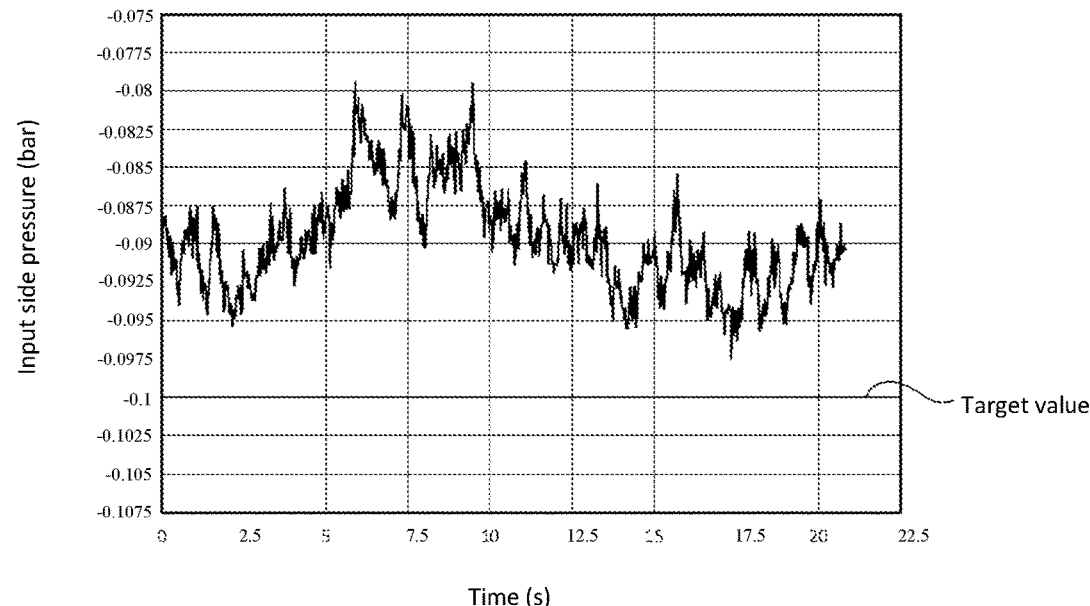

FIG. 7(a) is a diagram showing a change in the pressure of the coating material at the input side of the coating head 56 when coating is performed while the second rotary arm 23 of robot arm 15 is in the horizontal state. In addition, FIG. 7(b) is a diagram showing a change in the pressure of the coating material at the output side of the coating head 56 when coating is performed while the second rotary arm 23 of robot arm 15 is in the horizontal state. In addition, FIG. 8(a) is a diagram showing a change in the pressure of the coating material at the input side of the coating head 56 when coating is performed by changing the posture of the second rotary arm 23 of the robot arm 15. In addition, FIG. 8(b) is a diagram showing a change in the pressure of the coating material at the output side of the coating head 56 when coating is performed by changing the posture of the second rotary arm 23 of the robot arm 15. In these figures, measurement results are shown about the case where the coating head is moved from position P4 to position P5. It should be noted that the pressure of coating material at the input side of the coating head 56 is 0.1 bar, the pressure of the coating material at the output side of the coating head 56 is set to a target value of, for example, −0.1 bar.

As shown in FIG. 7(a) and FIG. 7(b), when coating is performed while the second rotary arm 23 is in the horizontal state, the pressure of coating material at the input side of the coating head 56, i.e., flowing toward the coating head 56, is changing with a range of 0.09 bar to 0.5 bar. In other words, it was found that the pressure of coating material flowing toward the coating head 56 changed around the target value, and the coating material was stably supplied to the coating head 56. In addition, the pressure of coating material at the output side of the coating head 56, i.e., delivered from the coating head 56, is changing within a range of −0.0925 bar to −0.1075 bar. In other words, it was found that the pressure of coating material delivered from the coating head 56 changed around the target value, and the coating material was stably delivered from the coating head 56.

On the other hand, as shown in FIG. 8(a) and FIG. 8(b), when coating while the second rotary arm 23 is tilted so that the coating head 56 is positioned downward, the pressure of the coating material flowing at the input side of the coating head 56, i.e., flowing toward the coating head 56, is changing within a range of 0.093 bar to 0.106 bar. In other words, it has been found that the pressure of coating material flowing toward the coating head 56 changed around the target value, and the coating material is stably flowing toward the coating head 56. However, the pressure of coating material at the output side of the coating head 56, i.e., delivered from the coating head 56, is changing within a range of −0.078 bar to −0.0975 bar. In other words, it was found that the pressure of the coating material delivered from the coating head 56 changed at a value outside of the target value, and the coating material was not stably delivered from the coating head 56.

From such results, it was found that when coating is performed while the second rotary arm 23 is in a horizontal state, the effect of the hydraulic head differences between the coating head 56 and the coating material circulation device 51 was smaller and the coating material can be circulated stably compared to the case when coating is performed while the second rotary arm 23 is tilted. In other words, in the coating robot 10, it is desirable for the second rotary arm 23 to be in a horizontal state when coating the vehicle body FR by the coating head 56, and only if it is difficult for the second rotary arm 23 to be in a horizontal state, tilt the second rotary arm 23 by a predetermined angle. This can stabilize the pressure of coating material flowing through the supply path 57, the return flow path 58 of the coating material circulation device 51 by suppressing the effect of hydraulic head differences between the coating head 56 and the coating material circulation device 51. That means the coating material can be circulated stably between the coating material tank 55 and the coating head 56.

Figure 9:
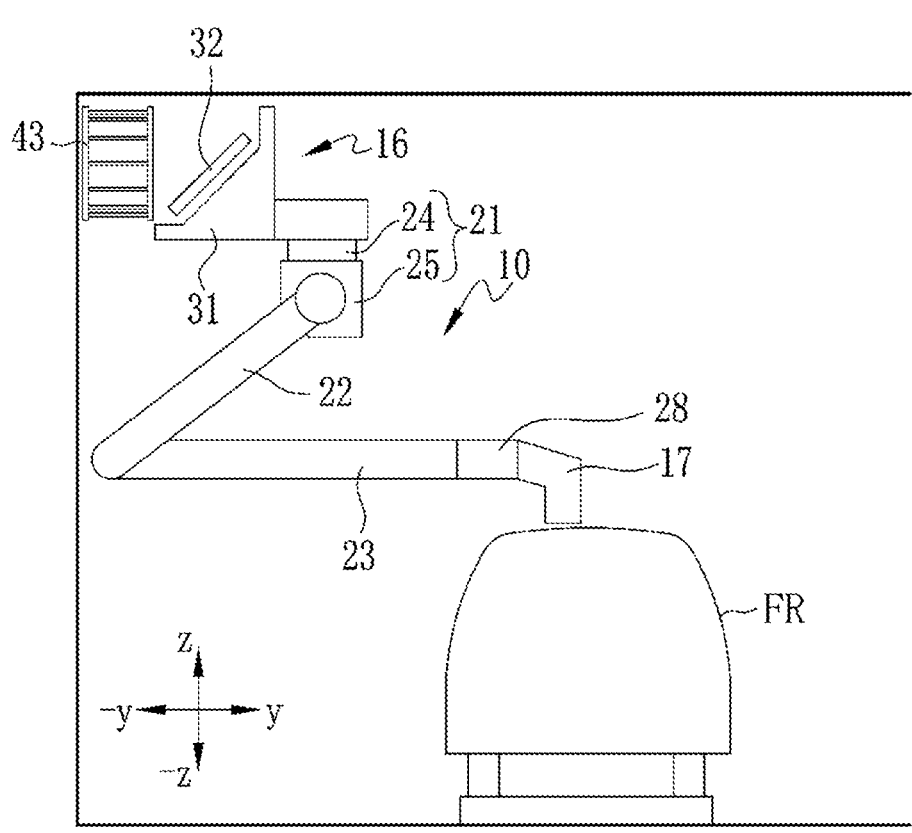
FIG. 9 It is a diagram showing an example of a coating robot installed above a vehicle body, such as a side wall or ceiling surface of a coating chamber, rather than the floor surface of the coating chamber.

In this embodiment, the case in which the moving device 16 is installed on the floor surface of the coating chamber is described, but there is no need to limit it to this case, and, as shown in FIG. 9, for example, the moving device 16 can be installed above the object to be coated, for example, on the side wall of the coating chamber or the ceiling surface of the coating chamber. According to this invention, it is no longer necessary to arrange the elements required for coating on the floor surface, so it is possible to provide a coating chamber with a smaller floor area required for coating the vehicle body FR.

In this embodiment, coating by coating head 56 with the second rotary arm 23 of the robot arm 15 held in a horizontal state inhibits the occurrence and change of hydraulic head differences between the coating material circulation device 51 and the coating head 56. In case of coating objects having a coating surface with a height difference, such as a bonnet and a roof, etc. provided in the vehicle body FR, it may be necessary to rotate the first rotary arm 22 and the second rotary arm 23 of the robot arm 15 in order to move the coating head 56 up and down, and it may be difficult to keep the second rotary arm 23 in a horizontal state due to these movements. In order to cope with such a case, it is also possible to maintain the second rotary arm 23 in a horizontal state by, for example, providing a lifting device to raise and lower the rotation portion 25 at the base 21 of the robot arm 15 and raising and lowering the rotation portion 25 relative to the fixed portion 24.

Moreover, in case of coating objects having a coating surface with a difference in height, such as a bonnet and a roof, etc. provided in the vehicle body FR, coating can be performed using a coating robot that differs depending on the coating location, such as providing a coating robot that coats the bonnet and a coating robot that coats the roof, and in the coating operation by each coating robot, the second rotary arm can be kept horizontal.

In addition, when moving the coating head 56 along an external shape such as a roof or bonnet, etc., the first rotary arm 22 and second rotary arm 23 of the coating robot 10 may be rotated, but in such cases the coating head 56 will move slightly in the z- or −z-direction in FIG. 1, but no pressure fluctuations will occur. In addition, if the coating head 56 is moved abruptly or the coating head 56 is moved up and down widely, the position of the first rotary arm 22 and the second rotary arm 23 of the coating robot 10 will be changed abruptly, resulting in fluctuations in the pressure of coating material, but in this embodiment, the position of the first rotary arm 22 and the second rotary arm 23 of the coating robot 10 will be kept constant, so the pressure fluctuations associated with changes in the position of these arms can be prevented.

In this embodiment, the arm control unit 102 controls the posture of the second rotary arm 23 in the robot arm 15 based on the data of the external shape of the vehicle body FR stored in the arm memory 106, but the arm control unit 102 can also control the posture of the second rotary arm 23 to maintain the horizontal state using, in addition to the data of the external shape of the vehicle body FR, the pressure values measured by the pressure gauges 69 and 79 provided in the coating material circulation device 51. In this case, the arm control unit 102 drives the motors M2 and M3 to hold the second rotary arm 23 in a horizontal state so that the pressure value measured by the pressure gauges 69 and 79 is constant or the fluctuation of the pressure value is within a predetermined range.

Effects

The coating robot 10 according to this invention has a coating head 56 capable of discharging coating material toward the vehicle body FR, a supply path 57 and a return flow path 58 circulating the coating material between a coating material tank 55 storing the coating material and a coating head 56, and it is a coating robot 10 equipped with a coating material circulation device 51 capable of controlling the pressure of the coating material flowing in the supply path 57 and the return flow path 58, and a robot arm 15 having a coating head 56 and gear pumps 62 and 80; the robot arm 15 is a multi-axis arm equipped with a first rotary arm 22, a second rotary arm 23, and movable shaft portions 26 and 27 that connect these arms to each other, and it has an arm control unit 102 that controls the posture of the first rotary arm 22 and the second rotary arm 23, which constitute the multi-axis arm during coating of the vehicle body FR by the coating head 56, to maintain the relative position of the coating head 56 and the coating material circulation device 51 constant, or to suppress fluctuations in said relative position within a predetermined allowable range, and a moving device 16 that moves the multi-axis arm along the coating direction of the vehicle body FR in the coating head 56 during coating of the vehicle body FR by the coating head 56.

For example, if there is no moving device, the base of the multi-axis arm will be secured at a predetermined position. At this time, if the position to be coated by the coating head is close to the position of the base of the multi-axis arm, the arm members that make up the multi-axis arm will be in an erect state, while if the position to be coated by the coating head is far from the position of the base of the multi-axis arm, the arm members that make up the multi-axis arm will be in a horizontal state. In other words, when the base of the multi-axis arm is secured, pressure control of coating material flowing through the circulation path requires not only operation of the multi-axis arm, but also consideration of the hydraulic head differences between the supply device and the coating head, which complicates pressure control of the coating flowing through the circulation path.

On the other hand, in this invention, the relative position of the coating head 56 and the coating material circulation device 51 is held constant, or the fluctuation of the said relative position is suppressed within a predetermined tolerance. Therefore, in pressure control of coating material flowing through the supply path 57 and the return flow path 58, the effect of the hydraulic head differences between the coating material circulation device 51 and the coating head 56 can be greatly reduced, making it easier to control the pressure of coating material in the supply path 57 and the return flow path 58.

In addition, the supply path 57 supplies the coating material stored in the coating material tank 55 to the coating head 56, and the return flow path 58 returns the coating material not used by the coating head 56 to the coating material tank 55, and it also has a gear pump 62 that pumps coating material stored in the coating material tank 55 to the supply path 57, a gear pump 80 that draws coating material from the coating head 56 to the return flow path 58, a pressure gauge 69 that detects the pressure of coating material dispensed to the supply path 57, a pressure gauge 79 that detects the pressure of coating material drawn to the return flow path 58, and a coating material supply control unit 103 for controlling a dispensing amount of coating material by the gear pump 62 based on the detection result by the pressure gauge 69 and for controlling a drawing amount of coating material by the gear pump 80 based on the detection result by the pressure gauge 79.

According to this configuration, during coating of the vehicle body FR by the coating head 56, the gear pumps 62 and 80 can be controlled based on the pressure of coating material fed into the supply path 57 of the coating material circulation device 51 and the pressure of coating material drawn into the return flow path 58, so that the pressure of coating material in each flow path can be kept at the appropriate pressure.

In addition, the arm control unit 102 controls the posture of the first rotary arm 22 and second rotary arm 23 of the robot arm 15 based on detection results from the pressure gauges 69 and 79.

For example, in the coating material circulation device 51, the pressure of coating material supplied to the coating head 56 based on the detection results by the pressure gauges 69 and 79 and the pressure of coating material refluxed to the coating material tank 55 is controlled. For example, the pressure value detected by the pressure gauges 69 and 79 varies based on the posture change of the robot arm 15. Therefore, the arm control unit 102 can maintain the same height of the coating material circulation device 51 and the coating head 56 in the height direction of the vehicle body FR by using the detection results by these detection means, even without providing a sensor to detect the height of the coating material circulation device 51 or the coating head 56, or can suppress the fluctuation of the height within a predetermined allowable height range.

In addition, the robot arm 15 has a base 21 that supports the first rotary arm 22 and the second rotary arm 23, which are coupled via movable shaft portions 26 and 27, to rotate freely in the 2-axis direction; the moving device 16 has a rail 32 extending along the direction of coating of the vehicle body FR by the coating head 56 and a drive side sprocket 41, a driven side sprocket 42, a drive belt 43, and a drive motor 110 that move the base 21 along a rail 32, and the rail 32 is provided on the floor surface of the coating chamber for coating the vehicle body FR.

According to this invention, the robot arm 15 can be moved in accordance with the position of the vehicle body FR to be coated by the coating head 56 in a state when the coating head 56 and the coating material circulation device 51 are always held at the same height.

In addition, the robot arm 15 has a base 21 that supports the first rotary arm 22 and the second rotary arm 23, which are coupled via movable shaft portions 26 and 27, to rotate freely in the 2-axis direction; the moving device 16 has a rail 32 extending along the direction of coating of the vehicle body FR by the coating head 56 and a drive side sprocket 41, a driven side sprocket 42, a drive belt 43, and a drive motor 110 that move the base 21 along the rail 32, and the rail 32 is provided at a position on the side surface of the coating chamber for coating the vehicle body FR or above the vehicle body to be coated.

According to this invention, the robot arm 15 can be moved in accordance with the position of the vehicle body FR to be coated by the coating head 56 in a state when the coating head 56 and the coating material circulation device 51 are always held at the same height. In addition, by arranging the rail 32 on the side surface of the coating chamber or above the vehicle body FR to be coated, it is no longer necessary to arrange the elements required for coating on the floor surface of the coating chamber, so it is possible to provide a coating chamber with a smaller floor area required when coating of the vehicle body FR is performed.

DESCRIPTION OF REFERENCE NUMERALS

10 . . . coating robot (robot for coating vehicle body)
15 . . . robot arm
16 . . . moving device
21 . . . base (base unit)
22 . . . first rotary arm
23 . . . second rotary arm
33 . . . drive mechanism (drive means)
55 . . . coating material tank (reservoir)
56 . . . coating head
57 . . . supply path
58 . . . return flow path (return flow path)
62 . . . gear pump (delivery means)
69 . . . pressure gauge (first detection means)
79 . . . pressure gauge (second detection means)
80 . . . gear pump (retraction means)

102 . . . arm control unit (position control means)
103 . . . coating material supply control unit (pressure control means)

The invention claimed is:
1. A robot for coating a vehicle body, comprising:
an arm,
  wherein the arm comprises:
    a coating head,
      the coating head configured to dispense coating material onto the vehicle body; and
    a supply device,
      wherein the supply device includes a circulation path for circulating the coating material between a reservoir storing the coating material and the coating head, and
      the supply device is configured for controlling a pressure of the coating material flowing through the circulation path;
  wherein the arm is a multi-axis arm including multiple arm members and a movable shaft connecting each arm member to each other, and further comprises:
  a posture control means that controls the posture of the multiple arm members constituting the said multi-axis arm during coating of the vehicle body by the coating head to maintain the relative position of the coating head and the supply device at a constant level or to suppress fluctuations in the relative position within a predetermined allowable range; and
  a moving mechanism for moving the multi-axis arm along the coating direction of the vehicle body in the coating head during coating of the vehicle body by the coating head;
wherein the circulation path includes:
  a supply path for supplying the coating material stored in the reservoir to the coating head, and
  a return flow path for returning the coating material not used by the coating head to the reservoir;
wherein the supply device includes:
  a dispensing means for feeding the coating material stored in the reservoir to the supply path;
  a retracting means for drawing the coating material from the coating head into the return flow path;
  a first detection means for detecting the pressure of coating material fed to the supply path;
  a second detection means for detecting the pressure of coating material drawn into the return flow path; and
  a pressure control means for controlling:
    a dispensing amount of coating material by the dispensing means based on the detection result by the first detection means, and
    a drawing amount of coating material by the retracting means based on the detection result by the second detection means;
wherein the posture control means controls a posture of the multiple arm members constituting the multi-axis arm based on the detection result from the first detection means and the second detection means.

2. The robot according to claim 1, wherein:
the arm includes a base that rotatably supports the multiple arm members coupled via the movable shaft in a 2-axis direction.

3. The robot according to claim 1, wherein:
the arm includes a base that rotatably supports the multiple arm members coupled via the movable shaft in a 2-axis direction.

4. The robot according to claim 2, wherein the moving mechanism includes:

a guide member extending along a coating direction of the coating head; and a driving means for moving the base along the guide member, wherein the guide member is provided on a floor surface of a coating chamber for coating the vehicle body.

5. The robot according to claim 3, wherein the moving mechanism includes:

a guide member extending along a coating direction of the coating head; and a driving means for moving the base along the guide member, wherein the guide member is provided at a location on a side surface of a coating chamber for coating the vehicle body or above the vehicle body to be coated.

* * * * *